United States Patent Office 3,127,436
Patented Mar. 31, 1964

3,127,436
ADDUCTS OF HEXAMETHYLBIGUANIDE AND METHOD FOR PREPARING SAME
Kenneth G. Flynn, Bridgeport, and Frederic C. Schaefer, Darien, Conn., assignors to American Cyanamid Company, Stamford, Conn., a corporation of Maine
No Drawing. Filed May 28, 1962, Ser. No. 197,904
6 Claims. (Cl. 260—465.5)

The present invention relates to hexamethylbiguanide derivatives and methods for preparing the same. More particularly, it relates to adducts formed by reacting hexamethylbiguanide with an α,β-unsaturated compound. Still more particularly, it is concerned with hexamethylbiguanide adducts formed by reacting hexamethylbiguanide and with an α,β-unsaturated compound activated by an electron withdrawing group.

The invention has for its principal object the formation of hexamethylbiguanide adducts adopted for use as a catalyst in polyurethane foam preparations. According to the present invention, the adducts of hexamethylbiguanide with an α,β-unsaturated compound are formed in the following schematic manner:

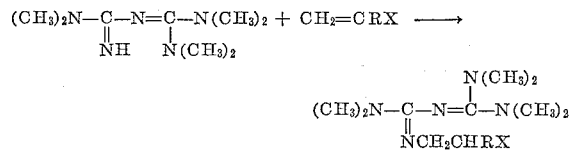

where R is hydrogen or a lower alkyl substituent of from one to four carbon atoms, and X is an electron withdrawing group such as a nitrile, an amide, or a lower alkyl ester. Resultant adducts are soluble in most organic solvents, such as acetonitrile, ethanol, benzene, carbon tetrachloride, and the like.

Illustrative of α,β-unsaturated compounds activated by an electron withdrawing group are: acrylonitrile, acrylamide, methylacrylate, ethylacrylate, methylmethacrylate and methylethacrylate. The aforementioned α,β-unsaturated compounds may be added in equimolar amounts to the hexamethylbiguanide. However, up to about five mol percent excess or more of the α,β-unsaturated compound can be added without any deleterious effects.

The reaction whereby the adduct is formed occurs at room temperature. However, if desired, the reactants may be heated to temperatures above room temperature, namely between about 30° C. and 45° C., so that the reaction is accelerated and recovery of desired product is swiftly realized.

In order to facilitate a further understanding of the invention, the following examples are presented primarily for purposes of illustrating certain more specific details thereof. The scope of the invention is not to be deemed limited thereby, except as defined in the claims. Unless otherwise stated, the parts are by weight:

EXAMPLE 1

*Preparation of the Adduct of Hexamethylbiguanide and Acrylonitrile*

The adduct prepared below can be represented by the formula:

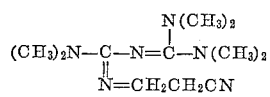

A solution of 8 parts of acrylonitrile in 50 parts of acetonitrile is added dropwise over a seven minute period to a stirred solution of 27.8 parts of hexamethylbiguanide in 100 parts of acetonitrile at room temperature. Solvent is removed leaving an orange liquid. The latter crystallizes out of solution by reducing the temperature to about 0° C. Recrystallization of recovered crystals from hot hexane is performed with difficulty, since an oil is formed along with the crystals. Crude yield of crystals is 72%. After several recrystallizations, a yield of 10.8 parts of white crystalline adduct having a melting point between 66° C. and 68° C. is obtained. Upon analysis for resultant adduct, the following is found in percent:

Calculated for $N_6C_{11}N_{22}$: C, 55.46; H, 9.25; N, 35.29. Found: C, 55.54; H, 8.95; N, 35.60.

EXAMPLE 2

*Preparation of the Adduct of Hexamethylbiguanide and Acrylamide*

The adduct prepared below can be represented by the formula:

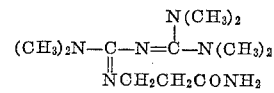

To a suitable vessel is added a solution of 18.5 parts of hexamethylbiguanide in 25 parts of benzene over a period of thirty-five minutes to a slurry in said vessel comprising 7.1 parts of acrylamide and 100 parts of benzene. Solid acrylamide dissolves upon the addition of hexamethylbiguanide. The reaction is refluxed for thirty minutes and allowed to cool to room temperature. During the removal of the benzene solvent, a white solid is obtained. Crude white solid having a melting point of from 126° C. to 131° C. is recrystallized twice from hot toluene to yield a white solid having a melting point of from 132° C. to 133° C. A 52% yield of desired product is obtained. Upon further analysis, the following is found in percent:

Calculated for $N_6OC_{11}H_{24}$: C, 51.56; H, 9.38; N, 32.81. Found: C, 51.26; H, 9.33; N, 32.73.

EXAMPLE 3

*Preparation of the Adduct of Hexamethylbiguanide and Ethylacrylate*

The adduct prepared below can be represented by the formula:

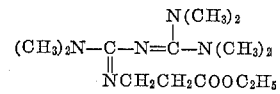

A solution of 10.5 parts of dry ethylacrylate in 25 parts of dry acetone is dissolved dropwise over a thirty-minute period at room temperature to 18.5 parts of hexamethylbiguanide in 100 parts of acetone. The reaction mixture is stirred for eighteen hours prior to the removal of solvent. Crude yield is 97% of a viscous yellow liquid which is dried with sodium sulfate and then distilled under 0.16 mm. Hg pressure at 121° C. to 123° C. A 54% yield of desired adduct is obtained as a yellowish liquid. Upon analysis, the following is found in percent:

Calculated: C, 54.74; H, 9.47; N, 24.56. Found: C, 54.12; H, 9.43; N, 24.01.

EXAMPLE 4

*Preparation of the Adduct of Hexamethylbiguanide and Methylacrylate*

The adduct prepared below can be represented by the formula:

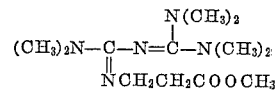

To a suitable flask containing 18.5 parts of hexamethylbiguanide in 75 parts of acetonitrile is added a solution of 9 parts of methylacrylate in 25 parts of acetonitrile dropwise over a twenty minute period at room temperature. Solvent is removed subsequent to agitation of the contents in said reaction vessel for about eighteen hours. An infrared spectrum of the reaction mass is obtained. This spectrum is found to be substantially identical to that of the ethylacrylate adduct. Crude yield of reaction product amounts to about 77.5% of theory.

EXAMPLE 5

*Preparation of the Adduct of Hexamethylbiguanide and Methylmethacrylate*

The adduct prepared below can be represented by the formula:

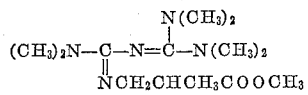

To 10.5 parts of methylmethacrylate in a nitrogen atmosphere at room temperature, dissolved in 25 parts of acetonitrile are added dropwise over a forty minute period 18.5 parts of hexamethylbiguanide previously dried employing sodium sulfate and dissolved in 75 parts of dry acetonitrile. The contents are stirred in a suitable reactor for about one and one-half hours. Acetonitrile is then removed and additional 8 parts of methylmethacrylate are added dropwise to resultant yellow liquid while stirring the reaction mass for twenty-four hours. The contents are left undisturbed for an additional fourteen hours and then heated to a temperature between about 100° C. and 120° C. for one hour. The color of the reaction mass changes from yellow to orange and its infrared spectrum shows substantial completion of the reaction. Thereafter, the mass is subjected to vacuum evaporation for two hours and a crude yield of an orange liquid amounting to 97%, based on theory, is obtained. Distillation of the adduct at 110° C. to 120° C. at 0.05 mm. Hg pressure results in a substantially pure product which analyzes in percent as follows: Calculated for $N_5O_2C_{13}H_{27}$: C, 54.74; H, 9.47; N, 24.56. Found: C, 54.20; H, 9.18; N, 24.13.

Advantageously, each of the aforementioned adducts can be employed as a catalyst in the conventional preparation of polyurethane foams.

We claim:
1. The compound:

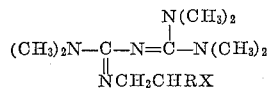

wherein R is a member selected from the group consisting of hydrogen and lower alkyl, and X is a member selected from the group consisting of —CN, —CONH$_2$ —COOR$_1$, wherein R$_1$ is an alkyl group of from one to four carbon atoms.

2. The compound:

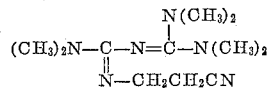

3. The compound:

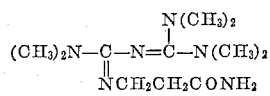

4. The compound:

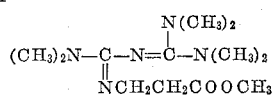

5. The compound:

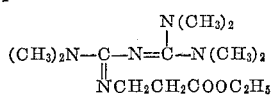

6. The compound:

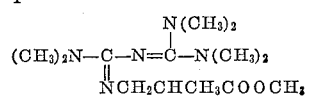

No references cited.